Aug. 27, 1929.　　　C. M. HARRIS　　　1,726,104

EXTERNAL COMBUSTION TURBINE

Filed Oct. 29, 1926

INVENTOR
Charles M. Harris
BY Fred E. Mefford
ATTORNEY

Patented Aug. 27, 1929.

1,726,104

UNITED STATES PATENT OFFICE.

CHARLES M. HARRIS, OF COLORADO SPRINGS, COLORADO.

EXTERNAL-COMBUSTION TURBINE.

Application filed October 29, 1926. Serial No. 145,058.

My invention relates to external combustion turbines and my object is to provide an improved turbine of this class wherein the flow of fuel mixture, compression, combustion and expansion are continuous. Other objects will appear as the description progresses.

Figures 2, 3:
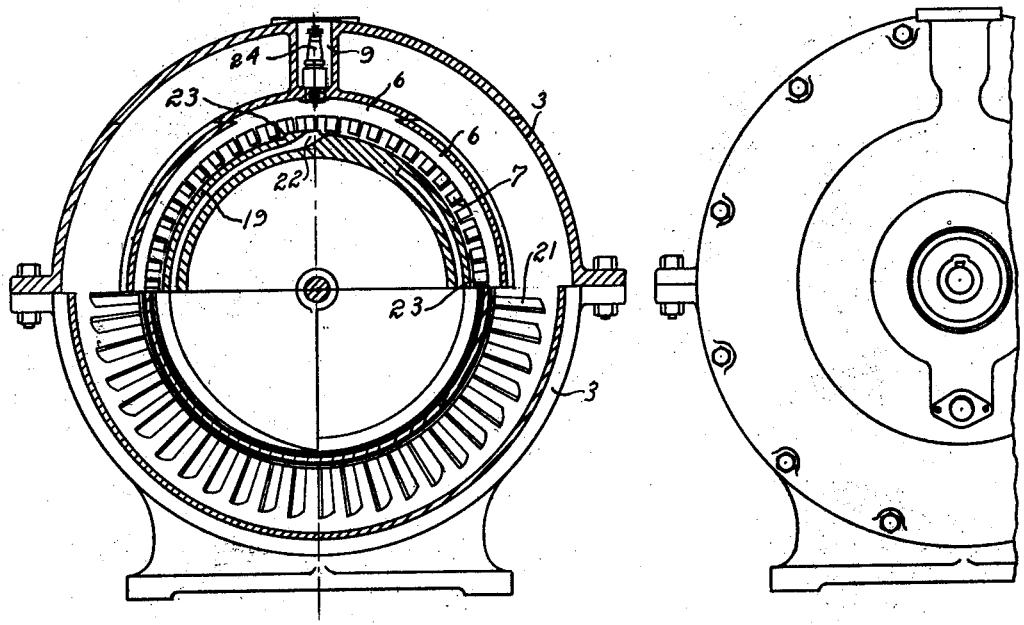
Figure 1:
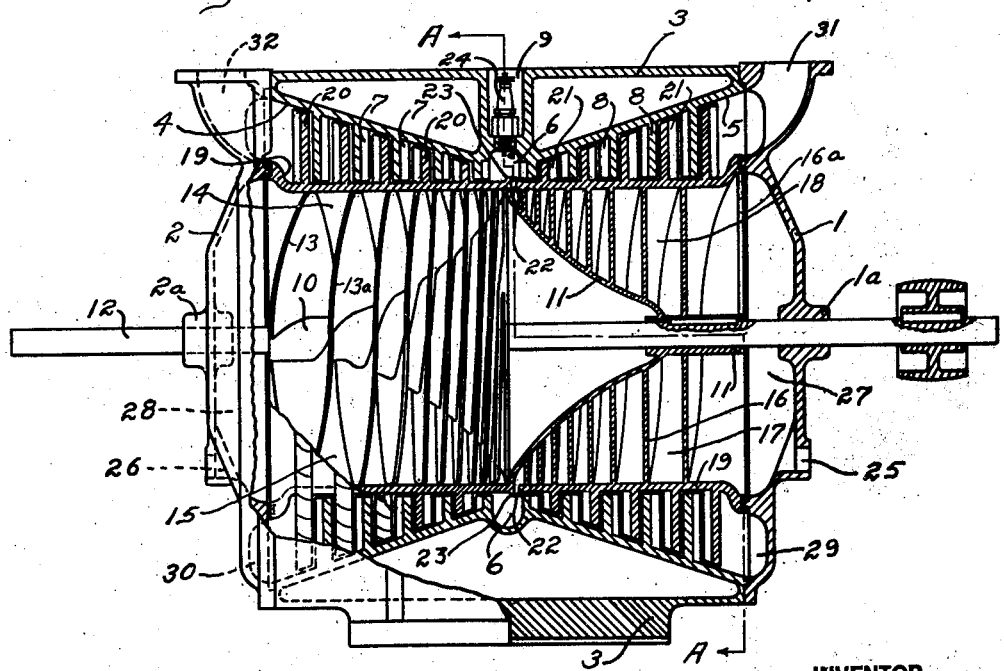
Figure 4:
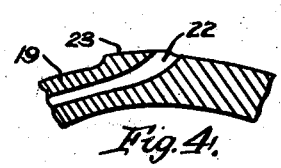

Figure 1 represents a side elevation of the turbine, partly in section; Fig. 2, a sectional elevation of the turbine on the line A—A in Fig. 1; Fig. 3, a fragmentary end elevation of the turbine; and Fig. 4, an enlarged fragmentary sectional view.

Although I show and describe the preferred embodiment of my invention, I do not thereby limit myself to the precise form shown, but wish it understood that within the scope of what hereinafter is claimed, various changes in the details of construction may be made without departing from the spirit of the invention.

The machine comprises two main elements, the housing and the rotor which contains the charger. The housing comprises two end portions 1 and 2 provided with bearings 1ᵃ and 2ᵃ, and drum portion 3 provided with a pair of converging faces 4 and 5 carrying a plurality of stator blades 7 and 8 disposed in annular rows so that the inner two rows contain the shortest blades and each succeeding row outward contains blades longer than the adjacent preceding row; an annular combustion chamber 6 disposed between the converged edges of said faces 4 and 5, and a spark plug chamber 9, containing the spark plug 24, communicating with annular combustion chamber 6.

The rotor comprises a pair of conical drums 10 and 11 rigidly mounted on a shaft 12 journalled in bearings 1ᵃ and 2ᵃ; helical blades 16 and 16ᵃ rigidly mounted on drum 11 so as to form helical channels 17 and 18 which taper toward the base of drum 10 and communicate with annular combustion chamber 6 via conduits 22; a similar pair of helical blades 13 and 13ᵃ mounted on drum 10 so as to form tapering helical channels 14 and 15 communicating with annular combustion chamber 6; a cylindrical rotor shell 19 mounted on said helical blades and provided with turbine blades 20 and 21 on the periphery, rotor blades 20 being disposed adjacent to stator blades 7 and rotor blades 21, adjacent to stator blades 8; and a projection 23 adjacent to each conduit 22.

The fuel mixture is drawn simultaneously from intake chambers 27 and 28 into helical channels 14, 15, 17 and 18 and passing through said channels enters annular combustion chamber 6 through conduits 22, where it is initially ignited by the action of the spark plug 24. The flow of the fuel mixture is continuous and after the initial ignition, the combustion is continuous. The expanding gases of combustion act outward upon the two sets of turbine blades, actuating the rotor and passing into exhaust chambers 29 and 30 and escaping through exhaust ports 31 and 32. As the mixture is introduced through the tapering helical channels, it becomes compressed by reason of the gradually diminishing cross sectional area of the helical channels, so that when it reaches the conduits 22 it has received its maximum compression. A vortex is caused by the projection 23 at each conduit 22 facilitating the flow of the mixture into the annular combustion chamber 6.

I claim:

1. In a turbine of the class described, the combination of a stator having an annular combustion chamber and stator blades; a shaft journalled in the end portions of said stator, a rotor comprising a pair of conical members disposed with their bases adjacent and rigidly mounted on said shaft; a plurality of helical blades on each conical member, the leads of the helices becoming progressively shorter and the blades progressively narrower towards the base of said conical member, forming a plurality of channels which become progressively smaller in width and depth; a cylindrical shell enclosing the outer ends of said helical blades, rotor blades mounted on the periphery of said shell and adjacent the stator blades; and a plurality of conduits in said cylindrical shell, each communicating with one of said channels and with said annular combustion chamber.

2. In a turbine of the class described, the combination of a stator containing annular rows of stator blades and an annular combustion chamber; a shaft journalled in the end portions of said stator; a rotor comprising a pair of conical members disposed with their bases adjacent and rigidly mounted on said shaft, helical blades on each conical member forming helical channels which taper toward the base of said conical member, a cylindrical shell enclosing the outer ends of said helical blades, rotor blades mounted on the periphery of said shell and adjacent the stator blades, a conduit communicating with each helical channel and with said annular combustion chamber, and a projection on said rotor shell adjacent to each conduit; and an intake chamber and an exhaust chamber in said stator.

3. In combination, a stator having an annular combustion chamber; a shaft journalled in said stator; a pair of conical members disposed with their bases adjacent and mounted on said shaft; helical blades on each conical member forming helical channels which taper in width and depth toward the base of each conical member; a cylindrical shell enclosing the outer ends of said helical blades, a plurality of rotor blades mounted in annular rows on the outer portion of said shell and a conduit communicating with each helical channel and with said annular combustion chamber.

4. In a turbine of the class described, the combination of a stator having an annular combustion chamber; a shaft journalled in the end portions of said stator; a rotor comprising a pair of conical members mounted on said shaft, helical blades on each conical member forming helical channels, a cylindrical shell enclosing the outer ends of said helical blades, rotor blades mounted on the outer portion of said shell, and a conduit communicating with each helical channel and with said annular combustion chamber; and an intake chamber and an exhaust chamber in said stator.

CHARLES M. HARRIS.